April 10, 1934.   R. BECK   1,954,514
AIR OPERATED CONTROLLER
Filed Feb. 4, 1932   2 Sheets-Sheet 1

INVENTOR
Rudolf Beck
BY Darby & Darby
ATTORNEYS.

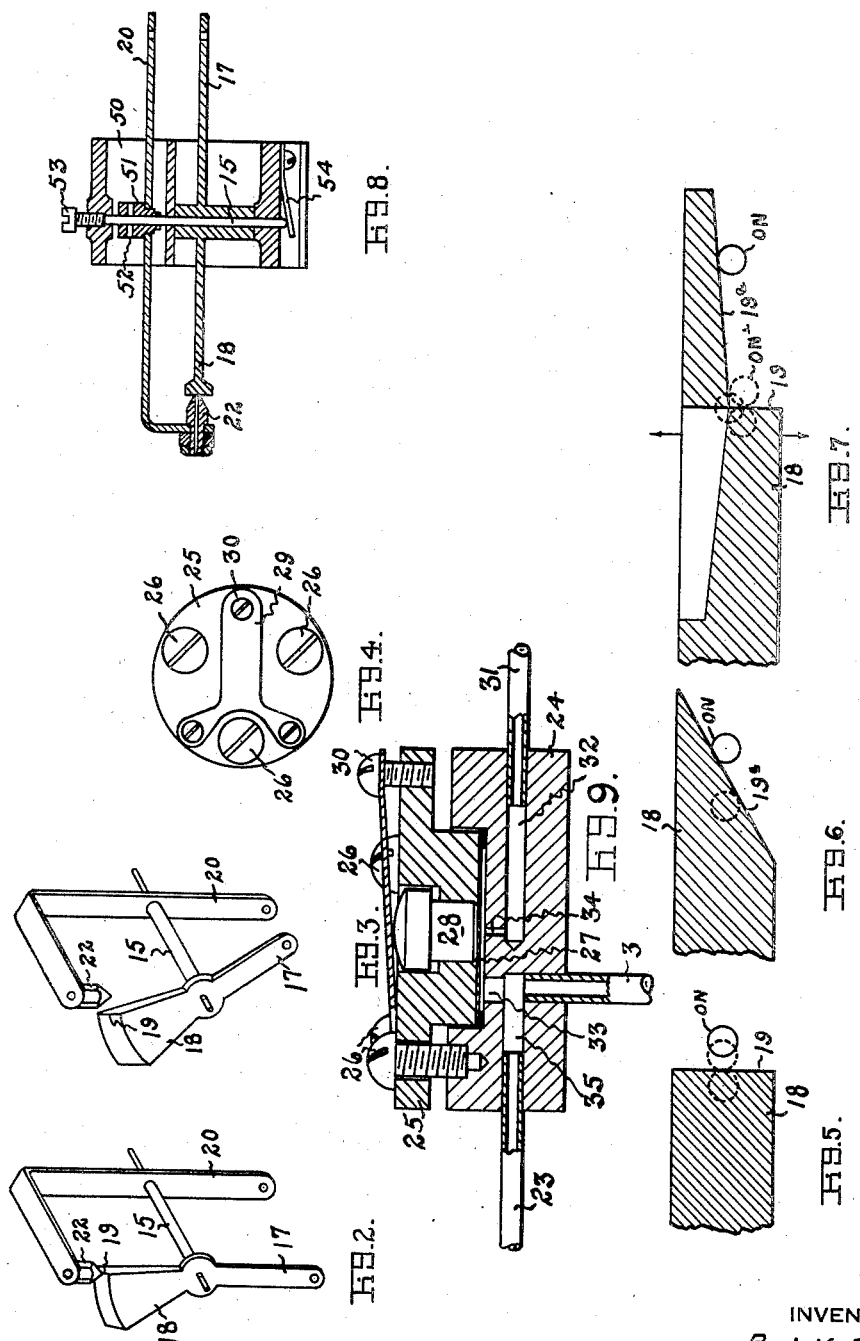

Patented Apr. 10, 1934

1,954,514

UNITED STATES PATENT OFFICE

1,954,514

AIR OPERATED CONTROLLER

Rudolf Beck, Bridgeport, Conn., assignor to Consolidated Ashcroft Hancock Company, Inc., Bridgeport, Conn., a corporation of Delaware Application February 4, 1932, Serial No. 590,816

5 Claims. (Cl. 236—82)

This invention relates to air operated controllers for controlling the operation of recording instruments and similar devices for producing indications and records of temperature and pressure conditions, and velocity and flow of liquids and gases.

The general object of this invention is the provision of a novel form of apparatus of this type which is a relatively simple construction and rugged and dependable in use.

These and many other objects, as will appear from the following disclosure, are secured by means of this invention.

This invention resides substantially in the combination, construction, arrangement and relative location of parts, all as will be pointed out in detail in the following specification in connection with the attached drawings and set forth in the appended claims.

Referring to the drawings—

Figs. 2 and 3 are detailed views showing the discharge nozzle controller in different positions;

Fig. 4 is a top plan view of the variable orifice device shown in section in Figure 1;

Figs. 5, 6 and 7 show modifications of the controlling edge of the discharge nozzle controller;

Fig. 8 is a cross-sectional view through an adjusting mechanism for adjusting the relative position between the discharge nozzle and its controller;

Fig. 9 is an enlarged cross-sectional view of the variable orifice device.

Figure 1:
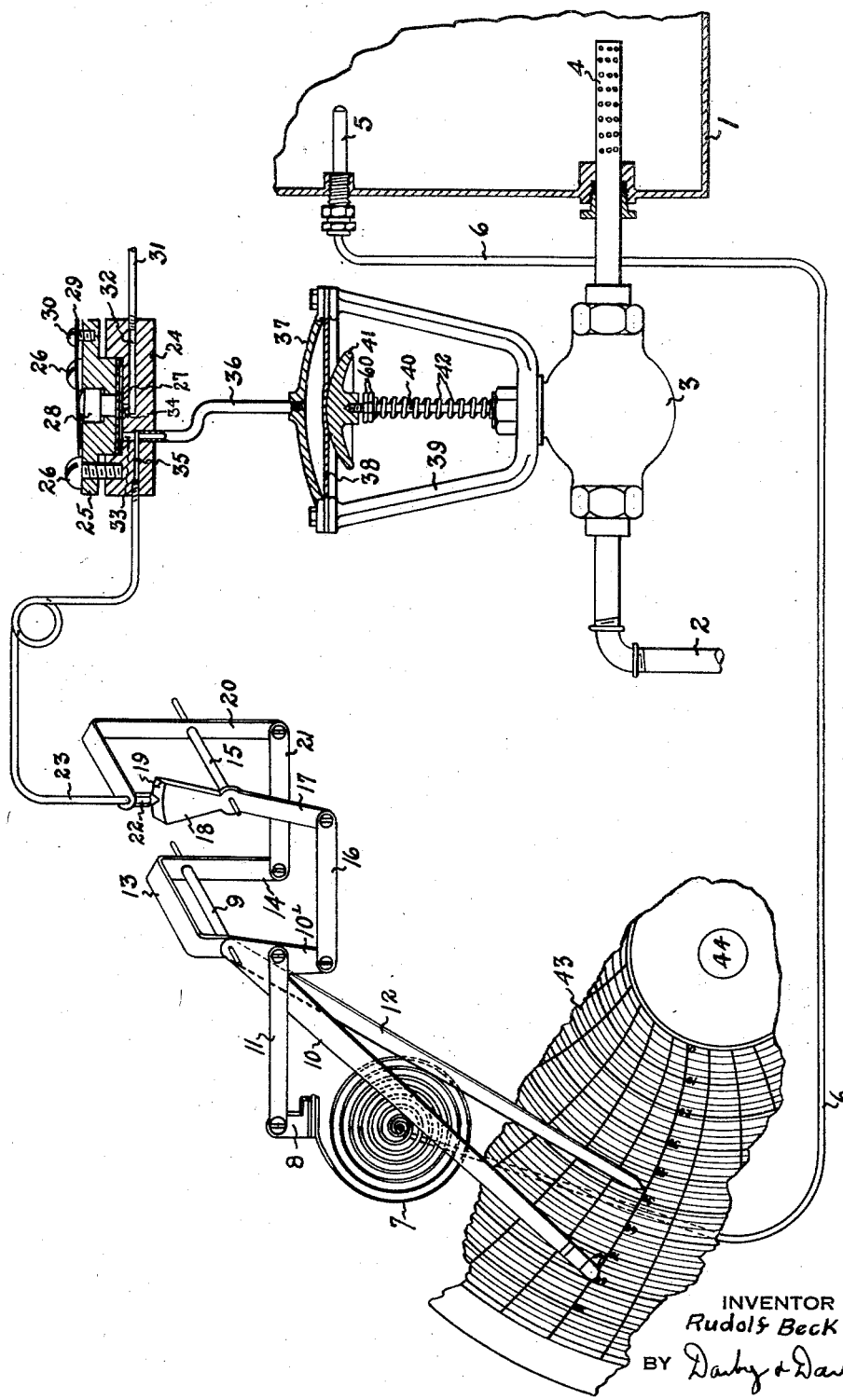
Figure 1 is a diagrammatic view with some parts in section and some parts broken away of the apparatus of this invention.

In general, the present invention is adapted for use in connection with indicating and recording instruments and involves a mechanism sensitive to temperature and/or pressure changes for controlling the temperature and/or pressure of any type of processing apparatus, and at the same time, and by means thereof, controlling indicating and/or recording instrument.

The nature, details of construction and operation of the apparatus will be best understood by direct and detailed reference to the drawings. At 1 is shown the apparatus to be controlled and the temperature and pressure conditions of which it is desired to indicate and/or record. It indicates, generally, any type of apparatus to which the principles of this invention may be applied and may involve many types of manufacturing and processing apparatus used in the industries. By way of example, it may consist of a container for a liquid, the temperature of which it is desired to maintain between definite limits or substantially at a desired value. At 4 is a discharge pipe by means of which steam, for example, may be discharged into the container. Connected to the discharge member 4 is a normally open valve 3 through which steam passes from the pipe connection 2 connected with any suitable steam source. At 5 is a temperature sensitive bulb immersed in the liquid of the container and connected by means of a small bored tube 6 to a spirally formed hollow coil 7. The temperature sensitive bulb 5, the tube 6 and the coil 7 form an elongated closed chamber containing an expansionable liquid so that as pressure is increased the coil 7 expands, moving its free end to which the bracket 8 is attached to the left. Such a temperature sensitive element is well known in the arts in different forms. It may be well to note here that a pressure sensitive device might be substituted for the temperature sensitive bulb of this invention without departure from the scope of the invention. The fixed arbor 9 has pivotally mounted thereon a recording pen-arm 10 which is connected to the bracket 8 by means of a link member 11. At 12 is an indicating arm which may be set at various positions to indicate the control temperature to which the device is set. The pen-arm 10 and the indicating arm 12 may cooperate, for example, with a suitable polar chart 43 which is mounted on a shaft 44 driven by a suitable clockwork motor or the like, not shown.

The arm 12 is integral with a U-shaped shaft 13 pivotally mounted on the arbor 9. The pen-arm 10 has an auxiliary arm 10' which is the same length from the arbor 9 as the arm 14. At 15 is a second fixed arbor on which is pivotally mounted an L-shaped bracket 20, and the nozzle controller comprising an arm 17 and a segment-shaped extension 18. The arms 17 and 20 extend the same distance from the fixed arbor 15. Extension 10' and arm 17 are pivotally connected by the link 16 and arms 14 and 20 are pivotally connected by the link 21. The right-hand upper edge 19 of the segment-shaped extension 18 is the control edge thereof which cooperates with the discharge end of the nozzle 22 secured to the L-shaped bracket. At the upper end of the extension 18 is a portion of a cylinder and rotates about the arbor 15 so that there is approximately a clearance of 0.001 inch between it and the discharge end of the nozzle 22.

The nozzle 22 is connected by a small flexible tube 23 to a variable orifice device. This device comprises a plate 24 having a central recess within which fits a cap 25 which is held in place by means of screws 26. Clamped between the members 24 and 25 is a thin diaphragm 27 which, in normal position, is spaced a slight distance from the bottom surface of the recess in the plate 24. The cap 25 is provided with a central hole in which a button 28 is longitudinally slidable and engageable by means of a spring arm 29. The pressure of the spring arm 29 on the button 28 may be varied by means of an adjusting screw 30. In the plate 24 are the passages 32 and 35. An air pressure pipe 31 connects to one end of passage 32 and the small passage 34 opens into the recess in the plate 24 at the center below diaphragm 27. A passage 33 connects the recess below the diaphragm with passage 35 into which the tube 23 is secured. Passage 35 also opens into a pipe 36 which extends to a cover plate 37 which, together with a flexible diaphragm 38, provides a closed chamber which is in communication with the recess through the pipe 36. The cover plate 37 and diaphragm 38 are mounted on a frame 39, forming part of the valve 3. At 40 is the valve stem which operates the valve 3. The upper end of this stem 40 is provided with a button 41 which engages the flexible diaphragm 38. A coil spring 42 encircles the valve stem 40 and engages adjustable lock nuts 60 by means of which the pressure on the spring may be varied. Valve 3 is a normally open valve which is maintained in open position by means of the spring 42.

This apparatus operates as follows:—Arm 12 is set to a position indicating and controlling the temperature which it is desired to maintain within the apparatus 1, or below which the temperature is not to fall. In adjusting arm 12, nozzle 22 is positioned through the connecting link 21 between the U-shaped shaft 13 and the L-shaped arm 20. Let it be assumed, as indicated by the position of the mechanism in Fig. 1, that the temperature within the apparatus 1 has gone above the desired minimum temperature. At this time the cylindrical surface of the member 18 is opposite the end of the discharge nozzle 22 so that the discharge of air therefrom is restricted. It should be noted that the pipe 31 is connected to a suitable fluid pressure source, such as a source of compressed air. The discharge of air from nozzle 22 being restricted, the pressure in tube 23, passage 35, passage 33, chamber below diaphragm 27, passage 34, passage 32 and pipe 31 builds up. As a result, the pressure in pipe 36 and the chamber closed by diaphragm 38 builds up so that diaphragm 38 expands downwardly to the position shown. As a result, valve 3 is closed through the downward movement to button 41 and valve stem 40. Valve 3 being closed, the supply of steam to the apparatus 1 is cut off. As the temperature in the apparatus 1 begins to fall the temperature of the bulb 5 also falls, and the pressure in tube 6 and spring 7 decreases. As a result, the free end of spring 7 moves to the right, carrying with it bracket 8, link 11, arm 10 and its extension 10', link 16 and arm 17. This causes member 18 to rotate in a counter-clockwise direction so as to gradually move out from under nozzle 22 to a position such as shown in Fig. 3, for example.

The discharge of air from nozzle 22 is now unrestricted so that the pressure below diaphragm 27 falls, permitting button 28 to move it downwardly under the action of spring arm 29. The downward movement of diaphragm 27 effects a restricting action on the orifice formed at the point of issuance of passage 34 into the recess below the diaphragm. In other words, the parts of the variable orifice device are returned to a normal state of equilibrium in which air is passing through pipe 31, passage 32, passage 34, the space below diaphragm 27, passage 33, passage 35, tube 36, and nozzle 22 at a velocity as determined by the resistance to flow of air through the nozzle 22. The pressure in pipe 36 and the chamber formed by the flexible diaphragm 38 falls to a normal value, say, for example, two pounds per square inch, which is not sufficient to compress spring 42. Spring 42, therefore, opens valve 3 and steam begins to flow from pipe 2 into the apparatus 1 through the discharge connection 4.

The temperature of the liquid in the apparatus 1 gradually increases, effecting the temperature sensitive bulb 5 and creating a pressure in tube 6 and spring 7 so that the free end of the spring begins to move to the left. When the edge 19 of the member 18 reaches the position with respect to nozzle 22, as indicated in Fig. 2, pen-arm 10 is in coincidence with the control and indicating arm 12. As soon as member 18 passes under the nozzle 22, diaphragm 27 again lifts so that pressure may build up in the chamber formed by the flexible diaphragm 38 to close the valve 3. When the apparatus is in a state of equilibrium, the edge 19 of the member 18 will be in the position shown in Fig. 2 with respect to the nozzle 22. However, due to the normal and natural lag of the apparatus, there will be some over-travel in each direction.

In the temperature control form of mechanism the apparatus may be designed to meet the required characteristics of any particular system. For example, it may be desirable to have the valve 3 move from fully open to fully closed position by a change of ½ degree F. in the apparatus 1. In other cases, such sensitivity may cause hunting and it may be desirable, therefore, to design the apparatus so that the valve 3 will move from fully open to fully closed position under a temperature change of from 4 to 6 degrees F. As will be apparent to those skilled in the art the sensitivity of the apparatus is a matter of design.

An important feature of the present invention over prior known apparatus of a similar type resides in the fact that when nozzle 22 is unrestricted, the orifice formed by the issuance of passage 34 into the recess of plate 24 is restricted so that the amount of air escaping is at a minimum. This involves a matter of economics, since the escaping compressed air represents dissipating energy. Another advantage of this system is that nozzle 22 and the orifice can be made larger for a permissible and economical discharge of air, thereby minimizing the possibility of the clogging of the apparatus by the impurities which are always present in the air.

There is the further advantage in this structure of increased sensitivity. When the nozzle is wide open as in Figure 2, the orifice at 34 will be almost closed. As segment 18 gradually covers nozzle 22, as in Fig. 2, the pressure below diaphragm 27 will increase, lifting the diaphragm and increasing the orifice opening at 34. It is obvious that due to this increasing orifice opening it will require less of a movement of segment 18 to build up maximum pressure, consequently as the movement of segment 18 corresponds to changes in temperature, opening or closing of the valve 3 will be effected for a much smaller temperature change than when using a fixed orifice.

By placing the orifice, formed by the issuance of passage 34 into the recess, opposite the center of diaphragm 27 where the diaphragm undergoes maximum movement, the operation of the apparatus occurs rapidly so that valve 3 responds quickly to changing conditions.

The adaptability of the present mechanism resides in the variations in design of the control edge 19 of the member 18 which may be affected. Since the sensitivity and speed of operation of the valve 3 are controlled by the rate of relative movement between the member 18 and the nozzle 22 and are, in turn, affected by the shape or form of edge 19, the apparatus may be adapted for many purposes by varying these factors. Some possibilities of the apparatus have been indicated in Figs. 5, 6 and 7. In these figures the shaded arrow represents the developed cylindrical segment surface of the member 18. In the construction in Fig. 5, the control edge 19 of the member 18 is a straight edge, as shown. The circle ON represents the orifice of the nozzle 22. With this construction the member 18 travels a distance equal to the diameter of the orifice in moving from fully open to fully closed position, and vice versa. The full line circle ON is entirely free of the member 18 and represents a position similar to that of the parts in Fig. 3. The first dotted circle to the left represents the position of the parts in Fig. 2, and the second dotted circle to the left represents the position of the parts, as illustrated in Fig. 1.

In Fig. 6 the control edge 19ᵃ is oblique with respect to the direction of movement of the member 18. The member 18 travels a distance equal to approximately twice the diameter of the orifice in moving from fully open to fully closed position. This ratio can obviously be varied by changing the angle of the control edge. The full line circle ON represents fully open position and the dotted circle represents fully closed position.

In Fig. 7 an arrangement is shown in which the open to closed travel of the segment can be varied in a ratio of about one to ten by moving the member 18 in a direction parallel to its axis, as indicated by the arrows, a distance equal to one-half the diameter of the orifice. If the member 18 is moved axially in a direction so that the orifice is in the positon indicated at ON', the operation will be the same as that in Fig. 5. If the member 18 is moved axially to a position so that the orifice is at ON and the edge 19ᵃ controls it, the effect will be similar to that of Fig. 6. By positioning the member 18 between these extremes various conditions of operation may be effected. While other arrangements of the control edge of the member 18 are possible, that of Fig. 7 has a particular advantage of bringing the control point at which about one-half orifice opening is required, always to the same point of the segment's circumference. This is necessary in order to have the arms 10 and 12 coincident at the control temperature. In addition, the construction of Fig. 7 permits the use of one standard construction for varied applications, and the sensitivity of the apparatus can be changed after installation to suit the particular heat exchange device with which it is used.

In Fig. 8 is shown an adjustable mounting for the member 18 and the bracket support for the nozzle 22. In the construction of Fig. 8 the nozzle is shown axially adjustable rather than the member 18, since obviously a simpler mechanical construction results. A supporting plate 50 is provided in which is journaled the arbor 15 and on which is pivoted the member 18. Secured to the arbor 15 by means of a pin 52 is a hub 51 on which the arm 20 which supports the nozzle 22 is secured. A flat spring 54 rests against one end of the arbor 15 and a longitudinally adjustable screw 53 presses against the other end. With this simple construction it is possible to move the nozzle 22 axially with respect to the member 18 to effect relative adjustment in accordance with the description in connection with Fig. 7.

The control segment 18, instead of being made independent as shown in Figure 1, could be made a part of the pen-arm 10, and the nozzle 22 could be secured to the setting and indicating arm 12. While this would simplify the apparatus it has the disadvantage that the parts would be more crowded, and not so accessible.

One of the important distinctions between the apparatus of this invention and prior known apparatus in this art is that the vane of the prior art apparatus which corresponds to the segment in this apparatus operates against the retarding action of a spring which interferes with the correct operation of a system of this type and makes the prior art apparatus objectionable. Since controlling apparatus of this type is intended to be set for different control conditons at different points in its range the indicating scale, by means of which various settings are made possible, cannot be calibrated to allow for the variable retarding action of the coil spring. Hence such prior art apparatus does not operate accurately especially when adjusted to other settings than that for which it is originally calibrated. The device of this invention does not employ such a retarding spring and hence may be easily calibrated for accurate indication and recording for various settings of the apparatus within its range. The structure as disclosed gives accurate indications over the whole range of the device no matter at what control point the instrument is set.

It is apparent that this apparatus within the broad object set forth in this specification is capable of controlling the operation of refrigerating apparatus just as well as heating apparatus. Refrigerating apparatus is, of course, heat exchange apparatus and the system of this invention is as well adapted for refrigerating control as it is for control of positive heating apparatus. It would only require simple changes obvious to those skilled in the art to change the system disclosed to make it effective for refrigeration control. For such use the valve 3 would be arranged to open on the increase of temperature instead of closing. This can be accomplished either by reversing the seat in the valve so that downward movement of the diaphragm 38 will open the valve instead of closing it; for instance, so as to permit an increased flow of refrigerating medium. The other way would involve the use of a valve as disclosed but instead of using the righthand edge of the control segment the left-hand edge thereof would be used. The effect would then be the same, namely, of having valve 3 open on an increase of temperature instead of closing.

From the above description it will be apparent that this invention resides in certain principles of construction and operation which may be carried out by other physical constructions, and I do not, therefore, desire to be strictly limited to this disclosure which has been given for purposes of illustration only, but rather I prefer that my invention be defined by the scope of the appended claims.

What I seek to secure by United States Letters Patent is:

1. In a device as described, comprising an arbor and a discharge nozzle mounted on said arbor, a member oscillatable on said arbor in close proximity to the discharge nozzle, and means for axially adjusting the arbor to control the position of the discharge nozzle with respect to said member.

2. In a device as described, the combination comprising an oscillatable arbor, a nozzle member secured to the arbor for movement therewith, a control member mounted on the arbor in close proximity to the nozzle having a control edge comprising a portion at right angles and a portion at an angle to the line of relative movement between the nozzle and the member, and means for axially adjusting the nozzle with respect to said member.

3. A combination as described comprising heat exchange apparatus, a pipe connection thereto for supplying a fluid to said apparatus, a valve in said pipe for controlling the flow of fluid therethrough, a fluid pressure motor for operating said valve, a heat sensitive device subject to the temperature conditions in said apparatus, a responsive device connected to said heat sensitive device, a fluid discharge nozzle, an oscillatable member connected to said responsive device for movement thereby in front of said nozzle to control the escape of fluid therefrom a fluid connection to said nozzle for supplying fluid thereto, a member in said fluid connection providing a chamber forming part of the connection, a flexible member closing said chamber, the supply end of the connection opening into the chamber opposite the center of the flexible member, and a conduit connected to said chamber and opening thereinto and connected to said fluid pressure motor.

4. A device as described comprising a discharge nozzle, a member movable in close proximity to the discharge nozzle and having a control edge comprising a portion at right angles and a portion at an angle with the direction of movement of said member, an arbor carrying said discharge nozzle and means for axially adjusting the arbor so that the nozzle can be adjusted either opposite the portion of the control edge at right angles or opposite the portion at an angle or intermediately.

5. In a device of the class described, a control nozzle, a body member having a cavity therein and a passage opening into the cavity, a resilient wall forming a closed chamber with the cavity in the body member, a fluid pressure supply source connected to the passage, a connection between the nozzle and said chamber, means for controlling the escape of fluid pressure from the nozzle, the resilient wall of the chamber tending to close said passage with falling pressure in the chamber, resilient means to adjust the gap between the first passage and the resilient wall and fluid pressure operated means connected to and controlled by the pressure in said chamber.

RUDOLF BECK.